(12) United States Patent
Wang et al.

(10) Patent No.: US 12,342,011 B1
(45) Date of Patent: Jun. 24, 2025

(54) DYNAMIC CODEC SELECTION

(71) Applicant: Amazon Technologies, Inc., Seattle, WA (US)

(72) Inventors: Jian Wang, Burnaby (CA); Giridhar Kalpathy Narayanan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 187 days.

(21) Appl. No.: 18/345,532

(22) Filed: Jun. 30, 2023

(51) Int. Cl.
*H04N 21/2343* (2011.01)
*H04N 21/234* (2011.01)
*H04N 21/418* (2011.01)

(52) U.S. Cl.
CPC ... *H04N 21/2343* (2013.01); *H04N 21/23418* (2013.01)

(58) Field of Classification Search
CPC .............. H04N 21/2343; H04N 21/23418
See application file for complete search history.

(56) References Cited

U.S. PATENT DOCUMENTS

| | | | | |
|---|---|---|---|---|
| 12,063,260 | B2* | 8/2024 | Chen | H04L 65/80 |
| 12,067,088 | B2* | 8/2024 | Fuse | G06F 21/51 |
| 2018/0115475 | A1* | 4/2018 | Broom | H04N 21/4621 |
| 2020/0134099 | A1* | 4/2020 | Momchilov | G06F 3/0486 |
| 2022/0210213 | A1* | 6/2022 | Petrovic | H04N 21/2402 |
| 2025/0061984 | A1* | 2/2025 | Lambert | G16H 40/40 |

* cited by examiner

*Primary Examiner* — Tsion B Owens
(74) *Attorney, Agent, or Firm* — Knobbe, Martens, Olson & Bear, LLP

(57) ABSTRACT

A codec system dynamically selects a codec from multiple available codecs with a highest level of encoding quality at a computing device based at least in part on the available computing resources at a particular computing device. The codec system can continuously monitor encoding performance and if encoding with the selected codec uses too many computing resources, then the codec system can switch to a codec that uses fewer computing resources.

20 Claims, 5 Drawing Sheets

DYNAMIC CODEC SELECTION

BACKGROUND

When a video is recorded, digital video files are generated. Digital video files are composed of a series of images. A video with thirty images per second can quickly become very large. With respect to storage and bandwidth and other issues, large video files can be inefficient when being transferred over a network, such as is the case during real-time streaming. A codec can encode or decode a data stream, such as video. One such use of codecs can be for real-time streaming during a meeting. Codecs can thus address storage and speed issues by compressing data before transmission over a network.

Codecs can include, but are not limited to, H264 (also referred to as Advanced Video Coding), H265, VP9, VP8, and AV1. Codecs can execute on a computing device. Codecs can have varying levels of complexity, can place different loads on computer processors of computing devices, have varying levels of quality, and some can use more or fewer computing resources. Moreover, computing devices can have different hardware and can be under different loads at different times. Therefore, the encoding performance for each codec out of multiple codecs can differ based on the available hardware and/or load on a particular computing device.

BRIEF DESCRIPTION OF THE DRAWINGS

These and other features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
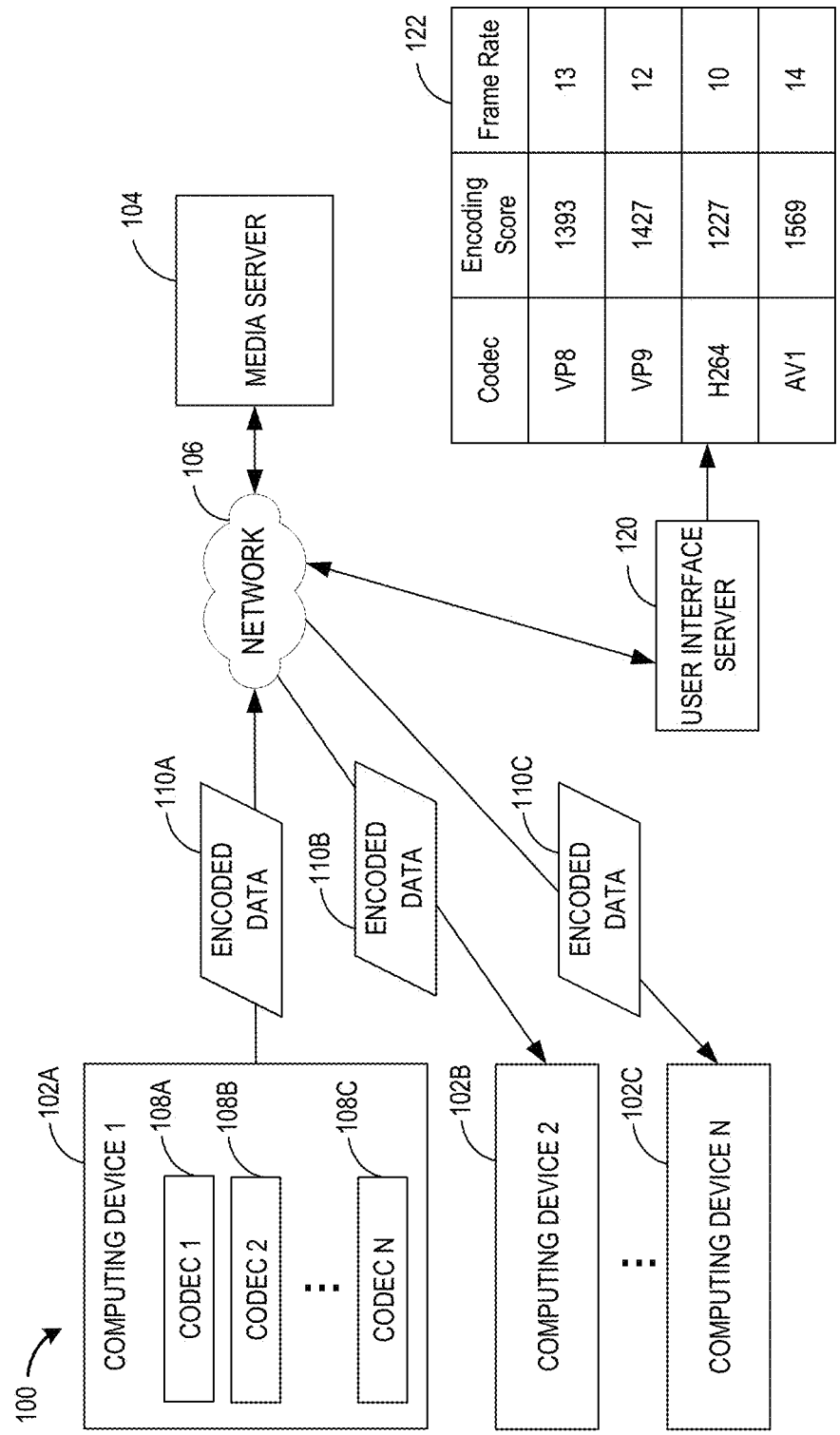
FIG. 1 is a schematic block diagram depicting an illustrative network environment for implementing dynamic codec selection.

Generally described, aspects of the present disclosure are directed to dynamic codec selection and/or switching based at least in part on encoding performance at an encoding device. A given computing device may have multiple codecs available where each codec executing on the device can achieve different levels of encoding quality and have different computing resource usage. A codec system, which can execute at least in part on a computing device, can select a codec from multiple available codecs. The codec system can generally select a codec with a highest level of encoding quality at a computing device. However, if the selected codec with the highest encoding quality uses more computing resources than are available at the computing device, then the computing device may be unable to keep up with encoding performance requirements, such as an encoding time requirement. For example, substantially real-time streaming video systems generally require substantially real-time encoding. As a result, use of the best quality codec may result in a poor user experience if the substantially real-time encoding cannot keep up with live stream video. Therefore, the codec system can select a highest level encoding quality codec based at least in part on the available computing resources at a particular computing device. The codec system can continuously monitor encoding performance and if encoding with the selected codec uses too many computing resources, then the codec system can switch to a codec that uses fewer computing resources. Conversely, in some embodiments, if the codec system detects that more computing resources are available, then the codec system can switch to a higher encoding quality codec at the computing device.

The systems and methods described herein may improve computer encoding performance and computer performance. As described herein, a given computing device may have multiple codecs available where each codec executing on the device can achieve different levels of encoding quality and have different computing resource usage. However, as described herein, a codec selection application can run tests for a computing device and dynamically select a particular codec from multiple codec options for encoding at a highest level of encoding quality based at least in part on the available computing resources for the particular computing device. Moreover, a codec monitoring application can monitor encoding and dynamically switch codecs if the selected codec uses too many computing resources at the computing device. By dynamically selecting a codec and potentially switching codecs during encoding, the systems and methods described herein can improve encoding performance, which can improve video quality over a computer network. Moreover, the systems and methods described herein can dynamically optimize encoding quality and computing resource usage at a particular computing device. As used herein, the term "computing resource" can refer to a physical or virtual component of limited availability within a computer system. Computing resources can include, but are not limited to, computer processors, processor cycles, and/or memory.

Turning to FIG. 1, an illustrative network environment 100 for implementing dynamic codec selection. The components of the network environment 100 can enable dynamic codec selection, monitoring, and/or switching, which were not available in existing systems. The network environment 100 may include computing devices 102A, 102B, 102C, a media server 104, and a user interface server 120. One use case of the network environment 100 can be for substantially real-time streaming, where one or more of the computing devices 102A, 102B, 102C are recording video data, encoding the video data, and transferring the encoded data to other computing devices 102A, 102B, 10C for later decoding. In some embodiments, the computing devices 102A, 102B, 102C can transmit encoded data using a substantially real-time communications framework, such as but not limited to, Web Real-Time Communications (WebRTC). As described herein, each of the computing devices 102A, 102B, 102C can have multiple codecs available for encoding. Multiple codecs available at a computing device 102A, 102B, 102C can include, but are not limited to, H264, H265, VP9, VP8, and/or AV1. Instead of the codec used being statically configured, a codec selection application (which can execute at the computing device 102A in some embodiments) can dynamically select a codec from multiple codecs. Moreover, a codec monitoring application (which can execute at the computing device 102A in some embodiments) can monitor the encoding and switch codecs based at least in part on the encoding performance. Accordingly, the components of the network environment 100 can improve encoding efficiency over some existing systems.

As used herein, the term "substantially" when used in conjunction with the term "real time" can refer to speeds in which no or little delay occurs perceptible to a user. Substantially in real time can be associated with a threshold latency requirement that can depend on the specific implementation. In some embodiments, latency under 500 milliseconds, 250 milliseconds, or 100 milliseconds can be substantially in real time depending on the specific context.

A first computing device 102A can include multiple codecs 108A, 108B, 108C. A codec selection application can test limitations, encoding efficiency, complexity, frame rate, resolution, and/or bit rate of the first computing device 102A. The codec selection application can then dynamically select a codec from the multiple codecs 108A, 108B, 108C. The codec selection application can select a codec from multiple codecs 108A, 108B, 108C that maximizes encoding quality without overwhelming resource usage. For example, the codec selection application can select the codec with a highest level of encoding quality that does not exceed eighty percent usage of computing resources of the computing device 102A. As another example, the codec selection application can select the codec with a highest level of encoding quality with an encoding time that does not drop more than five frames per second. In an example, the codec selection application can select AV1 out of H264, H265, VP9, VP8, and AV1 as the codec with the highest encoding quality for the computing resources available at the first computing device 102A. The first computing device 102A can use the selected codec to generate the encoded data 110A and transmit it over the network 106 to the media server 104. As described herein, a codec monitoring application can monitor computing resource usage and if the computing resource usage exceeds a threshold, then the codec monitoring application can switch to a codec associated with a lower expected usage of computing resources. Continuing with the example, if encoding with AV1 uses too many computing resources available at the first computing device 102A, then the codec monitoring application can select H264 as a codec that uses fewer computing resources but that sacrifices encoding quality relative to AV1.

The media server 104 can receive the encoded data 110A. In some embodiments, the media server 104 can be or include a Selective Forwarding Unit in a streaming meeting context. The media server 104 can receive encoded data from various clients and determine which data should be forwarded to other clients. As shown, the media server 104 can forward encoded data 110B, 110C to other computing devices 102B, 102C. As described herein, the first computing device 102A can more efficiently encode data that can improve performance of the other client computing devices 102B, 102C since the other devices can receive encoded data with reduced latency and/or received encoded data at higher video quality.

As described herein, one or more graphical user interfaces can be made available to administrators with summary information. Administrators can then advantageously make codec related decisions based at least in part on the summary information. Codec related decisions can include, but are not limited to, adding new codecs, removing codecs, and/or prioritizing or de-prioritizing some codecs over others. The computing devices 102A, 102B, 102C can send codec metadata to the media server 104. In some embodiments, at the conclusion of a stream, such as when a meeting has ended, each of the computing devices 102A, 102B, 102C can send codec metadata to the media server 104. The media server 104 can generate summary information from the codec metadata and provide the summary information to a user interface server 120. The user interface server 120 can present the summary information 122 in a graphical user interface. As shown, the summary information 122 can include, but not limited to, an encoding score and/or a frame rate for multiple codecs. As described herein, the computing devices 102A, 102B, 102C and/or the media server 104 can perform dynamic codec selection based at least in part on the codec metadata.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

In some embodiments, the media server 104 can be implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

While not illustrated in FIG. 1, in some embodiments, the first computing device 102A (which is the sending computing device) can transmit the encoded data 110A to the second computing device 102B without the media server 104. The computing devices 102A, 102B, 102C can share the encoded data via a decentralized communications model in which each of the computing devices 102A, 102B, 102C have the same or similar networking capabilities, which is also known as peer-to-peer (P2P) network. As used herein, the term "a recipient device" can refer to either a computing device 102B, 102C or a media server 104 that receives encoded data from a sending computing device 102A. Accordingly, a recipient device can be a computing device that receives encoded data from a sending computing device in a P2P network or a media server that received encoded data from a client in a client-server network.

Figure 2:
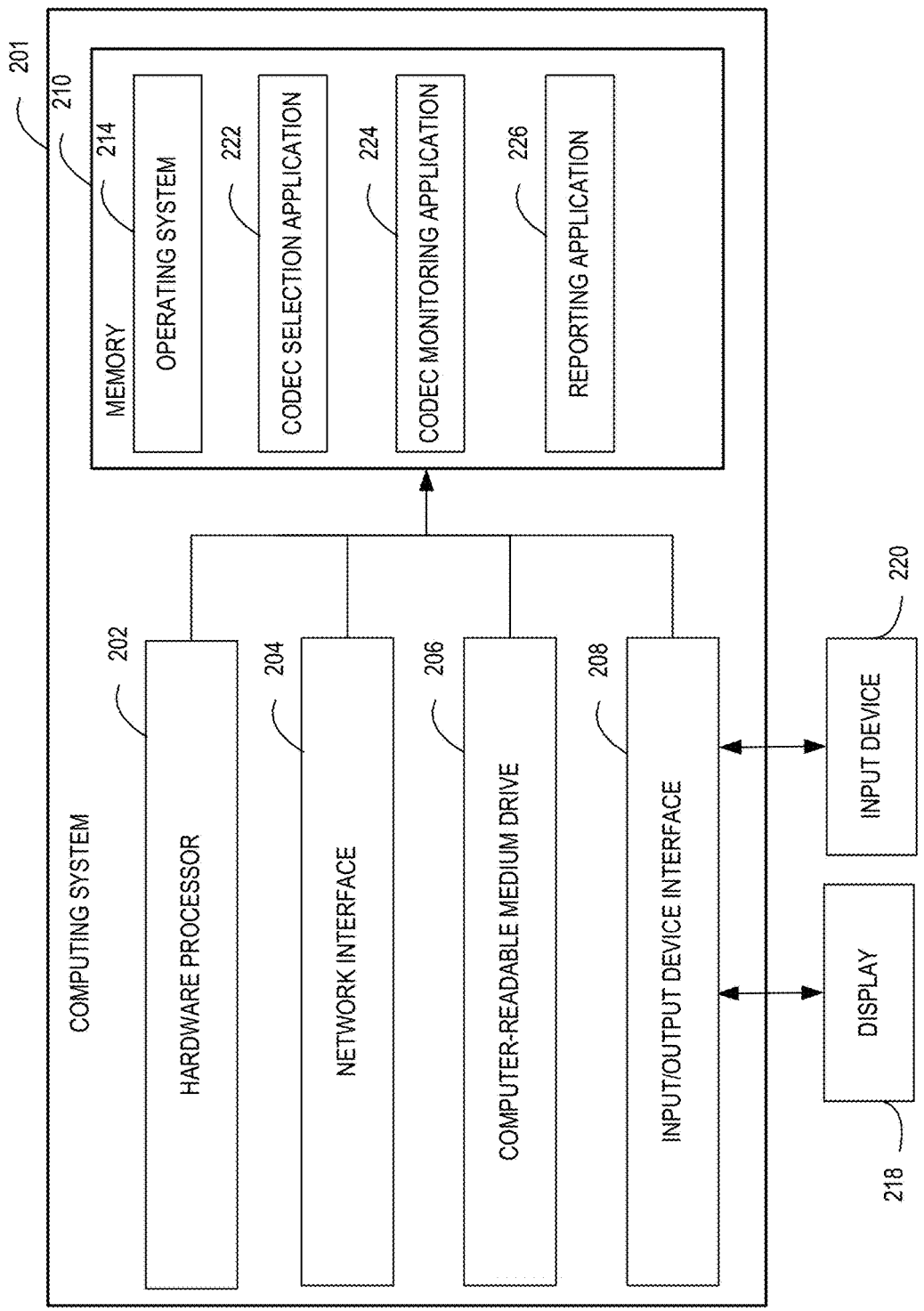
FIG. 2 is a schematic block diagram depicting an illustrative general architecture of a computing system for implementing a computing device referenced in the network environment depicted in FIG. 1.

FIG. 2 is a schematic diagram of an illustrative general architecture of a computing system 201 for implementing a computing device 102A, 102B, 102C referenced in the environment 100 in FIG. 1. In some embodiments, implementing dynamic codec selection at the computing device 102A, 102B, 102C can be an efficient solution to improve encoding performance since the determinations can occur using fewer computing resources at the sender level and in a distributed manner. In some embodiments, the computing device 102A, 102B, 102C can be or include, but is not limited to, a laptop or tablet computer, personal computer, personal digital assistant (PDA), hybrid PDA/mobile phone, smart wearable device (such as a smart watch), mobile phone, and/or a smartphone. The computing system 201 includes an arrangement of computer hardware and software components that may be used to execute the codec selection application 222, the codec monitoring application 224, and/or the reporting application 226. The general architecture of FIG. 2 can be used to implement other devices described herein, such as the media server 104 referenced in FIG. 1. The computing system 201 may include more (or fewer) components than those shown in FIG. 2. Further, other computing systems described herein may include similar implementation arrangements of computer hardware and/or software components.

The computing system 201 for implementing a computing device 102A, 102B, 102C may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, a display 218 and an input device 220. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information (such as a video) for a display 218 via the input/output device interface 208. The input/output device interface 208 may accept input from the input device 220, such as a video camera, keyboard, mouse, digital pen, and/or touch screen. The video camera can generate raw uncompressed images. The input/output device interface 208 may also output audio data to speakers or headphones (not shown).

The memory 210 may contain specifically configured computer program instructions that can be executed by the hardware processor 202. The memory 210 generally includes RAM, ROM and/or other persistent or non-transitory computer-readable storage media. The memory 210 may store an operating system 214 that provides computer program instructions for use by the hardware processor 202 in the general administration and operation of the computing system 201.

The memory 210 may include the codec selection application 222, the codec monitoring application 224, and/or the reporting application 226 that may be executed by the hardware processor 202. In some embodiments, codec selection application 222, the codec monitoring application 224, and/or the reporting application 226 may implement various aspects of the present disclosure. As described herein, the codec selection application 222 can execute tests to dynamically select a codec from multiple codecs that is predicted to have better encoding quality when executing at the computing device 102A, 102B, 102C. During encoding, the codec monitoring application 224 can monitor encoding performance and if the computing resource usage fails to satisfy a threshold, then the codec monitoring application 224 can select a difference codec that uses fewer computing resources. The reporting application 226 can cause codec metadata to be transmitted to the media server 104, which can be used to generate and present codec summary information that can be reviewed by an administrator. In some embodiments, the codec selection application 222, the codec monitoring application 224, and the reporting application 226 can be included in the same program, such as a JavaScript application executing in a network browser application in the computing device 102A, 102B, 102C.

Figure 3:
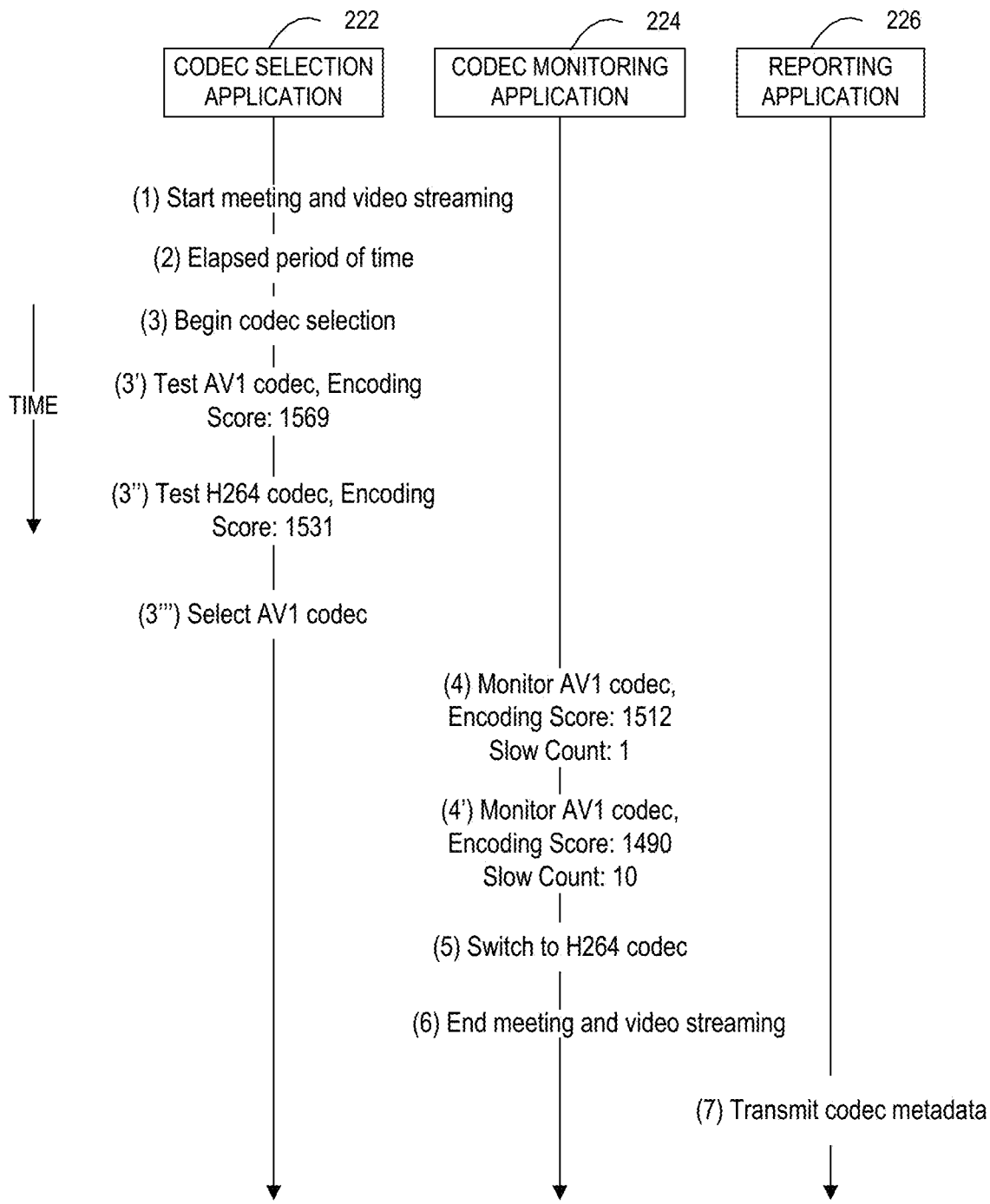
FIG. 3 is a schematic block diagram depicting illustrative codec selection, monitoring, and reporting actions.

FIG. 3 is a schematic block diagram depicting illustrative codec selection, monitoring, and reporting actions. In particular, FIG. 3 can illustrate actions that might be taken by the codec selection application 222, the codec monitoring application 224, and/or the reporting application 226 to improve encoding performance. As described herein, some previous systems did not have the ability to dynamically select a codec and computing devices would be required to use a codec with poor encoding performance for those devices. In some embodiments, the codec selection application 222 can execute actions that include testing different available codecs at a computing device 102A, 102B, 102C and making a decision to select a codec from the multiple available codecs for encoding. During encoding, the codec monitoring application 224 can monitor encoding performance at the computing device 102A, 102B, 102C. If the codec monitoring application 224 determines that a threshold is not satisfied, then the codec monitoring application 224 can switch the codec used for encoding at the computing device 102A, 102B, 102C. Accordingly, the actions of the codec selection application 222 and/or the codec monitoring application 224 can advantageously select or switch to a codec most suitable for the computing device 102A, 102B, 102C. The reporting application 226 can also provide codec metadata, which can be used for later codec analysis to ultimately improve encoding performance at the computing devices 102A, 102B, 102C.

At one (1), a meeting can start and video streaming can begin. At two (2), after an elapsed period of time, the codec selection application 222 can execute at the computing device 102A, 102B, 102C. In some embodiments, substantially real-time communications frameworks can start with a relatively low bit-rate (such as a lower video resolution) and gradually increase the bit rate (and higher video resolution) over time. Thus, dynamic codec selection can begin via the codec selection application 222 can begin after a period of time (such thirty seconds while bit rate ramps up).

At three (3), the codec selection application 222 can begin codec selection. The codec selection application 222 can test each codec and select a codec based at least in part on the results of the tests. At three-prime (3'), the codec selection application 222 can test a first codec (here an AV1 codec). In some embodiments, the codec selection application 222 can test the first codec for a period of time (such as sixty seconds) and generate an encoding score at intervals (such as every second) during the testing period. As described herein, the codec selection application 222 can calculate an encoding score based at least in part on an a quality measurement (such as total pixels encoded combined with a bit rate) combined with a computing resource usage measurement (such as total pixels encoded combined with a total encoding time) for the first codec. The codec selection application 222 can further calculate a statistical measure (such as an average) encoding score from the interval encoding scores. As shown, the codec selection application 222 can calculate a first encoding score (here 1569) for the first codec (here AV1).

At three-double-prime (3'), the codec selection application 222 can test a second codec (here an H264 codec). The codec selection application 222 can test the second codec in a similar or same manner as the first codec. Thus, the codec selection application 222 can test the second codec for a period of time, generate an encoding score at intervals, and calculate a statistical measure from the interval encoding scores. As shown, the codec selection application 222 can calculate a second encoding score (here 1531) for the second codec (here H264). While not shown in FIG. 3, the codec selection application 222 can test additional available codecs.

At three-triple-prime (3'), the codec selection application 222 can select a codec. The codec selection application 222 can select a codec from multiple codecs based at least in part on the respective encoding scores. The codec selection application 222 can select a codec with an encoding score that satisfies a threshold. In some embodiments, the codec selection application 222 can select a codec with a highest encoding score (here the AV1 codec with the 1569 encoding score). Generally, the codec selection application 222 selects the codec with the highest encoding quality while balancing computing resource usage for the particular computing device 102A, 102B, 102C. The computing device 102A, 102B, 102C can encode video data with the selected codec.

At four (4), the codec monitoring application 224 can monitor the current codec (here AV1). Similar to the testing at three (3) by the codec selection application 222, the codec monitoring application 224 can monitor the performance of the current codec. In some embodiments, the codec monitoring application 224 can monitor the current codec for a sliding window of time (such as thirty seconds) and generate one or more encoding scores during the sliding window. As described herein, in some embodiments, the encoding scores calculated during codec monitoring can be used for codec reporting and/or to pre-select a codec prior to a subsequent execution. The codec monitoring application 224 can calculate an encoding score based at least in part on an encoding efficiency measurement and/or a complexity efficiency measurement for the current codec. The codec monitoring application 224 can further calculate a statistical measure (such as an average) encoding score from the encoding scores in the sliding window. In some embodiments, the codec monitoring application 224 can calculate another statistical measure of encoding scores, such as, but not limited to, an exponential moving average. The codec monitoring application 224 can determine a slowness indicator based at least in part on a total encoding time, a quantity of encoded frames, and/or processor load. The codec monitoring application 224 can determine a slowness indicator if any of the following are true: (j) total encoding time is greater than or equal to a threshold value (such as 500 milliseconds), (ii) the frame rate is below a threshold value (such as 25 frames per second), or (iii) a processor load indicator value matches "CPU" indicating the processor is overloaded. The codec monitoring application 224 can determine a slowness indicator at intervals during the sliding window. As shown, the codec monitoring application 224 can determine a current encoding score (here 1512) and a count of slowness indicators (here one slowness indicator). The codec monitoring application 224 can determine whether the monitored performance of the current codec fails to satisfy a threshold. In the example at four (4), the performance of the current codec can satisfy the threshold(s).

At four-prime (4'), the codec monitoring application 224 can test the current codec in an updated, second sliding window. The codec monitoring application 224 can monitor the current codec during the second sliding window in a similar or same manner as the first sliding window. The codec monitoring application 224 can calculate a statistical measure (such as an average) encoding score from the encoding scores in the second sliding window. The codec monitoring application 224 can determine a slowness indicator at intervals during the second sliding window. As shown, the codec monitoring application 224 can determine a current encoding score (here 1490) and a count of slowness indicators (here ten slowness indicators). The codec monitoring application 224 can determine that the monitored performance of the current codec fails to satisfy a threshold. For example, ten slowness events may exceed the slowness threshold of five slowness events per sliding window. Accordingly, at five (5), the codec monitoring application 224 can switch to a codec (here H264) associated with a lower expected usage of a computing resource. The recently selected codec may have lower quality than the previously selected codec.

At six (6), the meeting and video streaming can end. At seven (7), the reporting application 226 can generate and transmit codec metadata to the media server 104. The codec metadata can include, but is not limited to, data generated by the codec monitoring application 224, such as an exponential moving average of the encoding score for the selected codec. The exponential moving average can place greater weight and significant on the most recent data points, which can advantageously give an administrator an idea regarding recent encoding performance. As described herein, a user interface server 120 can present codec summary information in a graphical user interface for an administrator to analyze encoding performance.

Figure 4:
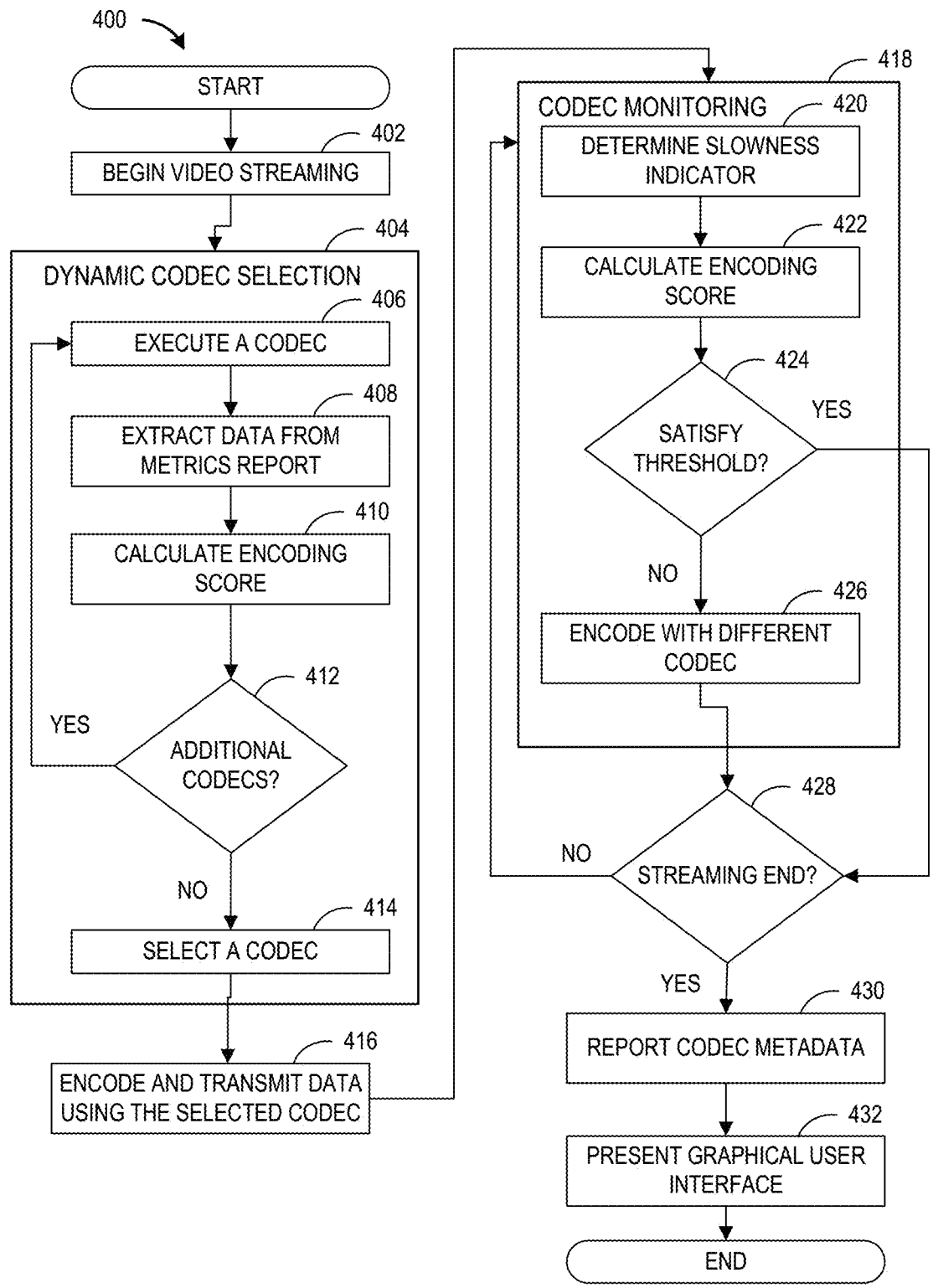
FIG. 4 is a flow chart depicting a method implemented by the computing device for dynamic codec selection, codec monitoring, and codec reporting.

FIG. 4 includes a flow chart depicting a computer-implemented method 400 for dynamic codec selection, codec monitoring, and codec reporting. The method 400 can enable dynamic codec selection, which was not available in existing systems. In particular, the dynamic codec selection can enable a customized codec selection per computing device 102A, 102B, 102C, which can enable improved encoding performance per computing device 102A, 102B, 102C. Moreover, the method 400 can perform codec monitoring such that if slowness is detected, the method 400 can switch to a codec associated with a lower expected usage of a computing resource, which can also improve encoding performance. The method 400 can also enable reporting features that can allow an administrator to review encoding performance of particular codecs and/or capture codec metadata that can be used to pre-select a codec for future executions.

As described herein, the computing device 102A, 102B, 102C may be implemented with the computing system 201. In some embodiments, the computing system 201 may include the codec selection application 222, the codec monitoring application 224, and/or the reporting application 226 each of which may implement aspects of the method 400. Some aspects of the method 400 may be implemented by the media server 104 and/or the user interface server 120. Moreover, some aspects of the method 400 may be described above with respect to FIG. 3.

Beginning at block 402, video streaming can begin. Two or more of the computing devices 102A, 102B, 102C can participate in the video stream. A computing devices 102A, 102B, 102C can receive a request to begin video streaming. As described herein, one such use case for video streaming could be a meeting that includes the computing devices 102A, 102B, 102C. In some embodiments, the start of a video stream can cause block 404 for codec selection to occur.

At block 404, dynamic codec selection can be performed. In some embodiments, dynamic codec selection can be performed at the computing device 102A. The block 404 for dynamic codec selection can include the sub-blocks 406, 408, 410, 412, 414 to process multiple codecs. As described herein, the dynamic codec selection at block 404 (and its sub-blocks 406, 408, 410, 412, 414) can enable a customized codec selection per computing device 102A, 102B, 102C. Each computing device 102A, 102B, 102C may be under different load and/or may have different hardware. Thus, at block 404, the codec selection application 222 can advantageously test multiple codecs and dynamically select a codec based at least in part on the encoding performance for each codec on the particular computing device 102A, 102B, 102C.

At sub-block 406, a first codec can be executed. The codec selection application 222 can execute the first codec at a particular computing device 102A for a time period (such as, but not limited to, ten seconds, thirty seconds, or sixty seconds). The first codec can correspond to, but is not limited to, a VP8 codec, a VP9 codec, a H264 codec, a H265 codec, or an AV1 codec. Each computing device 102A can have different hardware and/or be under different processor loads, which can affect the execution of the codec at the computing device 102A.

At sub-block 408, data can be extracted from a metrics report. The codec selection application 222 can extract data from a metrics report. In some embodiments, the codec selection application 222 can be executed at the computing device 102A. In other embodiments, the codec selection application 222 can be at least partially executed on a server, such as the media server 104, so long as the media server 104 receives the metrics report. As described herein, the video streaming can occur using WebRTC, which can provide a metrics report. The codec selection application 222 can extract data related to encoding from the metrics report, such as, but not limited to, encoded frames, frame width, frame height, a bit rate, and a total encoding time. The codec selection application 222 can determine total pixels by combining encoded frames, frame width, and frame height. In some embodiments, the codec selection application 222 can receive a metrics report and extract data from the metrics report at intervals (such as once per second).

At sub-block 410, an encoding score can be calculated. The codec selection application 222 can calculate a first encoding score for a first execution of the first codec at the computing device 102A. The encoding score can indicate (i) an encoding quality associated with the execution of the codec and (ii) a computing resource usage associated with the execution of the codec. The codec selection application 222 can calculate a quality metric that indicates an encoding quality of a video portion during the first execution. The codec selection application 222 can calculate a computing resource usage metric that indicates a quantity of processor cycles used to encode the video portion during the first execution. The codec selection application 222 can calculate an encoding score from (i) the total pixels encoded, (ii) the bit rate, and (iii) the total encoding time. The codec selection application 222 can calculate the quality metric from (i) the total pixels encoded and (ii) the bit rate. The codec selection application 222 can calculate the computing resource usage metric from (i) the total pixels encoded and (ii) the total encoding time. Encoding time can be a measure of processor cycles at the computing device 102A.

The quality metric can include an encoding efficiency value. The computing resource usage metric can include a complexity efficiency value. The codec selection application 222 can determine an encoding efficiency value based at least in part on a total pixels encoded for the first execution and a bit rate for the first execution. Pixels per bit can be an indicator of encoding quality efficiency. The codec selection application 222 can determine a complexity efficiency value based at least in part on the total pixels encoded and a total encoding time for the first execution. Pixels per encoding time can be an indicator of encoding complexity efficiency. The codec selection application 222 can combine the quality metric (which can include the encoding efficiency value) and the computing resource usage metric (which can include complexity efficiency value) as the encoding score. Thus, the encoding score can balance the quality metric and the computing resource usage metric. The codec selection application 222 can use the formulas in Table 1 below to calculate the encoding efficiency value, the complexity efficiency value, and the encoding score. In Table 1, the "TRUNC" function can return the integer part of a number by removing any fractional digits. The "LOG" or logarithm function (such as logarithm base 10) can be the inverse function to exponentiation.

TABLE 1 total pixels = encoded frames * frame width * frame height
Quality Efficiency
pixels ber bit = total pixels/bit rate
Complexity Efficiency
pixels per encoding time = total pixels/total encoding time
Encoding Score
encoding score = TRUNC(LOG(pixels per bit * pixels per encoding time) * 100)

In some embodiments, the codec selection application 222 can calculate a statistical measure as the encoding score from multiple encoding scores over an evaluation period for the codec. The codec selection application 222 can calculate an encoding score for each interval (such as one second) during the evaluation period. At the end of the evaluation period, the codec selection application 222 can calculate a statistical measure (such as, but not limited to, an average) from the multiple encoding scores.

At sub-block 412, it can be determined whether there are additional codecs to process. The codec selection application 222 can access a list of available codecs and process each available codec until there are none left. If there are additional codecs, the method 400 can return to sub-blocks 406, 408, 410 to execute a different codec, extract data from a metrics report, and calculate an encoding score, which can be similar to previous executions except with a different codec. Accordingly, the codec selection application 222 can calculate a second encoding score for a second execution of a second codec at the computing device 102A. If there are third, fourth, fifth codecs, etc., then the method 400 can calculate encoding scores for those additional codecs. If there are no additional codecs, the method can proceed to sub-block 414 to select a codec.

At sub-block 414, a codec can be selected. The codec selection application 222 can select the codec based at least in part on the respective encoding scores for each codec. In particular, the codec selection application 222 can select the first codec instead of the second codec based at least in part on the first encoding score and the seconding encoding score. The codec selection application 222 can identify that the first encoding score represents better encoding quality than the second encoding score based at least in part on the available computing resources at the computing device 102A. In some embodiments, the codec selection application 222 can select the codec with the highest encoding score, which can be customized for the particular computing device 102A.

While not illustrated in FIG. 4, in some embodiments, some or all aspects of block 404 for dynamic codec selection can occur before the beginning of video streaming. If the metrics reports are received prior to the beginning of video streaming, the codec selection application 222 can dynamically select a codec before streaming. Selecting a codec prior to video streaming can advantageously speed up encoding in some cases, since the codec determination can be pre-cached. Additional details regarding dynamic codec selection before video streaming are described herein, such as with respect to FIG. 5. In other cases, performing the block 404 for dynamic codec selection after the beginning of video streaming may provide a more accurate estimate of encoding performance due to being relatively close or contemporaneous with the actual video streaming.

At block 416, data can be encoded with the selected codec and the encoded data transmitted. The computing device 102A can generate first encoded video data with the first codec at the computing device 102A. The computing device 102A can transmit the first encoded video data to a recipient device, such as, but not limited to, the media server 104. As described herein, the media server 104 can transmit the encoded video data to other computing devices 102B, 102C, which can decode the encoded video data with the selected codec. In other embodiments, the computing device 102A can transmit the first encoded video data to other computing devices 102B, 102C without the media server 104 in a P2P network.

At block 418, codec monitoring can be performed. In some embodiments, codec monitoring can be performed at the computing device 102A. The block 418 for codec monitoring can include the sub-blocks 420, 422, 424, 426 for determining slowness, updating encoding scores, and determining whether to change the current codec. As described herein, the codec monitoring at block 418 (and its sub-blocks 420, 422, 424, 426) can enable slowness detection and cause a switch to a codec associated with a lower expected usage of a computing resource, which can also improve encoding performance. The codec monitoring application 224 can monitor encoding performance substantially in real-time and switch to a different codec, which can advantageously be performed on each computing device 102A, 102B, 102C such that the decision to switch is based at least in part on how efficiently or inefficiently the particular hardware of each computing device 102A, 102B, 102C is performing the encoding process.

At sub-block 420, a slowness indicator can be determined. The codec monitoring application 224 can monitor encoding performance of the selected codec at the computing device 102A. The codec monitoring application 224 can determine a quantity of frames encoded over a period of time. The codec monitoring application 224 can determine a slowness indicator based at least in part on the quantity of frames encoded over a period of time. Additionally or alternatively, the codec monitoring application 224 can determine an encoding time for the codec, an encoding frame rate for the codec, and/or a hardware processor load of the computing device 102A. The codec monitoring application 224 can determine a slowness indicator based at least in part on the encoding time, the encoding frame rate, and the hardware processor load. Similar to the codec selection application 222 that receives and extracts data from the metrics report, the codec monitoring application 224 can receive and extract data (such as encoding time and encoded frames) from the metrics report. The codec monitoring application 224 can determine an encoding time, an encoding frame rate, and/or a hardware processor load. In some embodiments, the metrics report can include a quality limitation reason, such as a hardware processor load indicator, which can indicate that a hardware processor of the computing device 102A is under significant load. The codec monitoring application 224 can receive the metrics report at intervals (such as once per second).

The codec monitoring application 224 can determine that an encoding metric fails to satisfy a threshold. The codec monitoring application 224 can determine that the encoding time fails to satisfy a first threshold. If the encoding time is relatively slow that can indicate hardware processor slowness. The codec monitoring application 224 can determine that the encoding frame rate fails to satisfy a second threshold. If the encoding frame rate is less than a target frame rate that can indicate hardware processor slowness. The codec monitoring application 224 can determine that the hardware processor load (which can be a reason code provided in a metrics report) fails to satisfy a third threshold. If any encoding metric fails a threshold, then the codec monitoring application 224 can determine that there is a slowness event. The codec monitoring application 224 can determine a slowness indicator if any of the following are true: (j) total encoding time is greater than or equal to a threshold value (such as 500 milliseconds), (ii) the frame rate is below a threshold value (such as 25 frames per second), or (iii) a processor load indicator value matches "CPU" indicating the processor is overloaded. The codec monitoring application 224 can determine a slowness indicator from a quantity of slowness events over a time period for the current codec. Additionally or alternatively, the codec monitoring application 224 can determine a slowness indicator from a quantity of consecutive slowness events over a time period for the current codec. Consecutive slowness events can be slowness events that are adjacent to one another. In particular, the codec monitoring application 224 can determine consecutive slowness events where, in the time period, a first slowness event and a second slowness event are detected, and the second slowness event follows the first slowness event without an intervening non-slowness event. A non-slowness event can be determined where the encoding metric(s) satisfy the threshold(s). If there is a break in slowness events, the count of consecutive slowness events would reset to zero. The codec monitoring application 224 can determine slowness indicator(s) over a sliding window, such as a sliding window of thirty seconds.

At sub-block 422, an encoding score can be calculated. The codec monitoring application 224 can calculate an encoding score. Sub-block 422 for calculating an encoding score during monitoring can be similar to the previous sub-block 410 for calculating an encoding score for dynamic codec selection. Similar to the codec selection application 222 that calculates an encoding score, the codec monitoring application 224 can calculate an encoding score for the current codec over the sliding window.

At sub-block 424, it can be determined whether the slowness indicator fails to satisfy a threshold. The codec monitoring application 224 can determine whether the slowness indicator fails to satisfy a threshold. The codec monitoring application 224 can determine whether the quantity of frames encoded over a period of time fails to satisfy a threshold. Additionally or alternatively, the codec monitoring application 224 can determine that quantity of slowness events over the time period for the current codec fails to satisfy a threshold (such as the count of slowness events being above a threshold number). The codec monitoring application 224 can determine that the quantity of consecutive slowness events over the time period for the current codec fails to satisfy a threshold (such as the count of consecutive slowness events being above a threshold number). If the slowness indicator(s) fail to satisfy the threshold(s), then the method 400 can proceed to sub-block 426 to select a difference codec and encoded with the different codec. If the slowness indicator(s) satisfy the threshold(s), then the method 400 can proceed to block 428 to check whether streaming ended.

In some embodiments, the codec monitoring application 224 can determine whether the current encoding score fails to satisfy a threshold. If the current encoding score fails to satisfy the threshold, then the method 400 can proceed to sub-block 426 to select a different codec. If the current encoding score satisfies the threshold (and the slowness indicator also satisfied the threshold), then the method 400 can proceed to block 428 to check whether streaming ended.

At sub-block 426, a different codec can be selected instead of the current codec and the different codec can be used for encoding. The codec monitoring application 224 can select a different codec, which can be a codec associated with a lower expected usage of a computing resource. The codec monitoring application 224 can determine that another codec is expected to use fewer computing resources at encoding than the first codec and select the other codec. The codec monitoring application 224 can determine the codec expected to use fewer computing resources at encoding based at least in part on data from a metrics report. In some embodiments, the codec monitoring application 224 can determine that one codec is expected to use fewer computing resources than another codec with the metrics report. In other embodiments, a predetermined codec can be determined ahead of time to be a codec associated with a lower expected usage of a computing resource. Using the predetermined codec associated with a lower expected usage of a computing resource may result in lower quality encoding. The computing device 102A can generate second encoded video data with the different codec at the computing device 102A. The computing device 102A can transmit the second encoded video data to the recipient device.

At block 428, it can be determined whether video streaming ended. The computing device 102A can determine whether streaming ended, and if it has not, then the method 400 can return to block 418 to continue monitoring encoding. If streaming has ended, the method 400 proceeds to block 430 to report codec metadata.

At block 430, codec metadata can be generated. The reporting application 226 can generate codec metadata. The reporting application 226 can calculate a statistical measure (such as an exponential moving average) from multiple encoding scores. The reporting application 226 can include additional data in the codec metadata, such as, but not limited to, frame rate and/or slowness indicators. The reporting application 226 can transmit codec metadata to the media server 104. The media server 104 can make the codec metadata available to the user interface server 120.

At block 432, a graphical user interface can be presented. The user interface server 120 can present a graphical user interface based at least in part on the codec metadata. In some embodiments, the graphical user interface can include a dashboard, which can show codecs, the encoding scores for the codecs, and/or frame rate for the codecs. As described herein, making codec metadata available to administrators can advantageously allow administrators to evaluate performance of the codecs. Administrators can then make adjustments to the available codecs for video streaming amongst the computing devices 102A, 102B, 102C.

Figure 5:
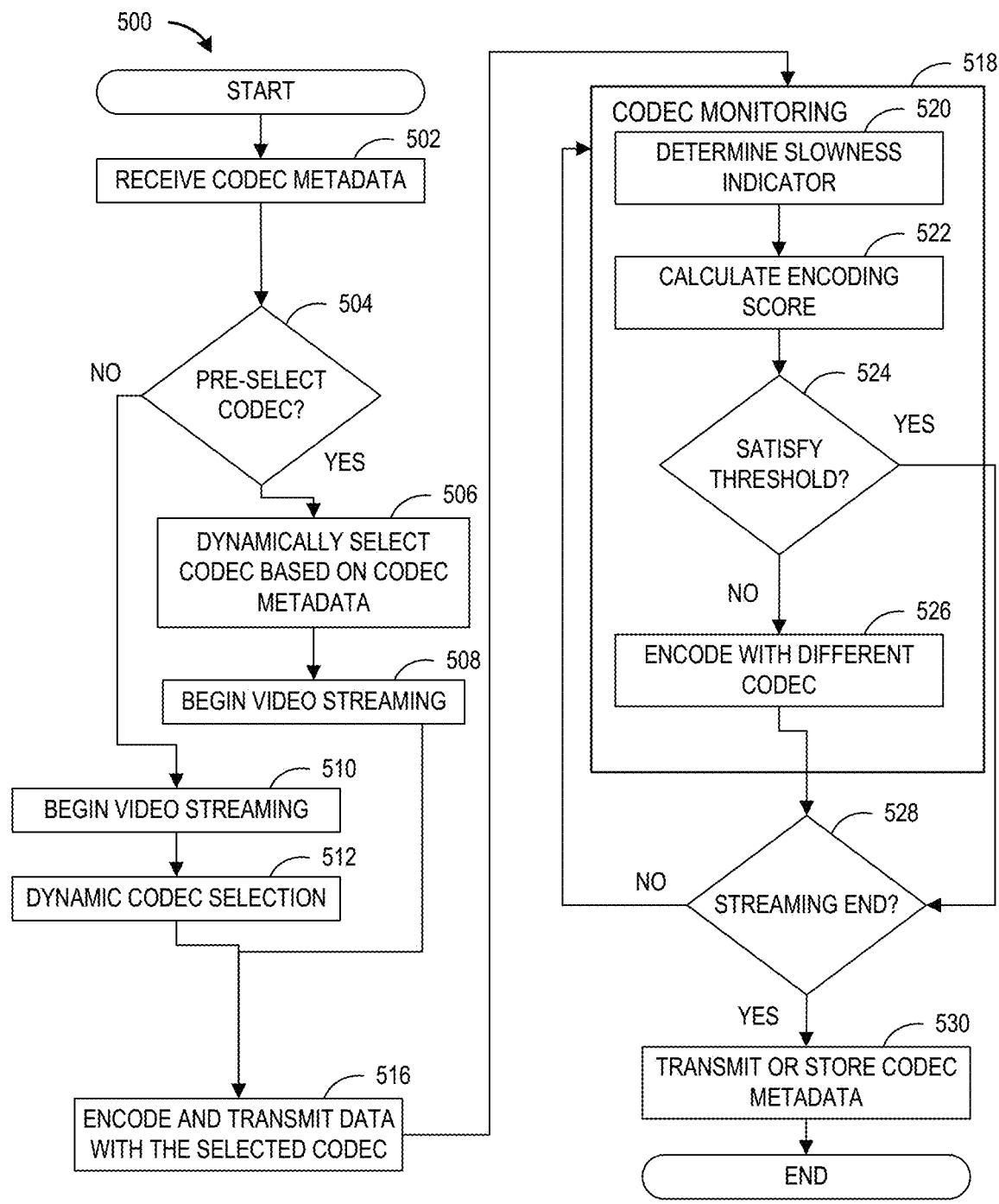
FIG. 5 is a flow chart depicting a method implemented by the computing device and/or a media server for dynamic codec selection based at least in part on codec metadata, codec monitoring, and codec reporting.

FIG. 5 includes a flow chart depicting a computer-implemented method 500 for dynamic codec selection based at least in part on codec metadata, codec monitoring, and codec reporting. The method 500 can enable optional dynamic codec selection based at least in part on codec metadata, which was not available in existing systems. In particular, the dynamic codec selection can be customized per computing device 102A and can occur before video streaming, which can enable improved encoding performance per computing device 102A.

Beginning at block 502, codec metadata can be received. The media server 104 can receive the codec metadata from the computing device 102A. Additionally or alternatively, the reporting application 226 can store the codec metadata in a data store, such as a data store in the computer-readable medium drive 206. The codec selection application 222 can receive the codec metadata from the data store. The codec metadata can include, but is not limited to, the codec type, encoded frames, frame width, frame height, a bit rate, and/or a total encoding time.

At block 504, a codec can be pre-selected before video streaming begins. The computing device 102A and/or the media server 104 can determine whether to pre-select a codec before video streaming begins. The computing device 102A and/or the media server 104 can access a saved setting that indicates whether pre-selection should occur. In some embodiments, the setting can be set by a user profile or an administrator profile. Dynamic pre-selection of a codec before video streaming can advantageously cause encoding with a selected codec to occur using fewer computing resources than dynamic selection after video streaming has started. If the method 500 determines that dynamic pre-selection should occur, the method proceeds to block 506 to dynamically pre-select a codec. Otherwise, the method 500 proceeds to block 510 to begin video streaming.

At block 506, a codec can be dynamically selected based at least in part on the codec metadata. The computing device 102A and/or the media server 104 can dynamically select a codec based at least in part on the codec metadata. The block 506 to dynamically pre-select a codec can be similar to block 404 for dynamic code selection (and some of its sub-blocks 410, 412, 414). However, instead of executing a codec and extracting data from a metrics report, the codec selection application 222 can use the codec metadata to calculate an encoding score for various codecs. The codec selection application 222 can then dynamically select a codec based at least in part on the calculated encoding scores. In some embodiments, the codec selection application 222 can select the codec with a highest encoding score. Video streaming can then begin at block 508, which can be similar to block 402 of FIG. 4 for video streaming beginning. As described herein, pre-selection of a codec can occur well before video streaming begins, which can advantageously enable encoding with a selected codec to occur using fewer computing resources than dynamic codec selection after video streaming has begun.

In the case without pre-selection, video streaming can begin at block 510 and then dynamic codec selection at block 512 can occur. Video streaming beginning at block 510 and dynamic codec selection at block 512 can be similar to or the same as video streaming beginning at block 402 and dynamic codec selection at sub-block 412 of FIG. 4.

At block 516, encoding and transmitting data can occur with the selected codec. The block 516 for encoding and transmitting data can be the same as or similar to the block 416 for encoding and transmitting data of FIG. 4. At block 518, codec monitoring can be performed. The block 518 for codec monitoring can be the same as or similar to the block 418 for codec monitoring of FIG. 4. The block 518 for codec monitoring can include the sub-blocks 520, 522, 524, 526 for determining slowness, updating encoding scores, determining whether to select a different codec, selecting a different codec, and encoding with the different codec. The sub-blocks 520, 522, 524, 526 of FIG. 5 can be similar to or the same as the sub-blocks 420, 422, 424, 426 of FIG. 4 for determining slowness, updating encoding scores, determining whether to select a different codec, selecting a different codec, and encoding with the different codec.

At block 528, it can be determined whether video streaming ended. The computing device 102A can determine whether streaming ended, and if it has not, then the method 500 can return to block 518 to continue monitoring encoding. If streaming has ended, the method 400 proceeds to block 530 to transmit codec metadata.

At block 530, codec metadata can be generated. The reporting application 226 can generate codec metadata. The reporting application 226 can generate codec data from data collected during codec monitoring, such as, but not limited to, the codec type, encoded frames, frame width, frame height, a bit rate, and/or a total encoding time. The reporting application 226 can transmit codec metadata to the media server 104 and/or store the codec metadata. While not shown, subsequent iterations of the method 500 can then cause pre-selection of a codec based at least in part on new codec metadata.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    receiving a request to begin video streaming;
    calculating a first encoding score for a first execution of a first codec at a computing device, wherein calculating the first encoding score comprises:
        calculating a first quality metric that indicates a first encoding quality of a first video portion during the first execution;
        calculating a first computing resource usage metric that indicates a first quantity of processor cycles used to encode the first video portion during the first execution; and
        combining the first quality metric and the first computing resource usage metric as the first encoding score;
    calculating a second encoding score for a second execution of a second codec at the computing device, wherein calculating the second encoding score comprises:
        calculating a second quality metric that indicates a second encoding quality of a second video portion during the second execution;
        calculating a second computing resource usage metric that indicates a second quantity of processor cycles used to encode the second video portion during the second execution; and
        combining the second quality metric and the second computing resource usage metric as the second encoding score;
    selecting the first codec instead of the second codec based at least in part on the first encoding score and the second encoding score;
    generating first encoded video data with the first codec at the computing device;
    transmitting the first encoded video data to a recipient device;
    monitoring encoding performance of the first codec at the computing device, wherein monitoring the encoding performance comprises:
        determining that a quantity of frames encoded over a period of time fails to satisfy a first threshold;
    selecting a third codec associated with a lower expected usage of a computing resource;
    generating second encoded video data with the third codec at the computing device; and
    transmitting the second encoded video data to the recipient device.

2. The computer-implemented method of claim 1, wherein calculating the first quality metric comprises:
    determining an encoding efficiency value based at least in part on a total pixels encoded for the first execution and a bit rate for the first execution, wherein calculating the first computing resource usage metric comprises:
    determining a complexity efficiency value based at least in part on the total pixels encoded and a total encoding time for the first execution, and wherein combining the first quality metric and the first computing resource usage metric comprises:
    combining the encoding efficiency value and the complexity efficiency value.

3. The computer-implemented method of claim 2, further comprising:
    determining, from a metrics report, (i) the total pixels encoded, (ii) the bit rate, and (iii) the total encoding time.

4. The computer-implemented method of claim 1, wherein calculating the first encoding score for the first codec comprises:
    calculating a statistical measure from a plurality of encoding scores over an evaluation period for the first codec.

5. The computer-implemented method of claim 1, wherein monitoring the encoding performance further comprises:
    determining a slowness indicator; and
    determining that the slowness indicator fails to satisfy a second threshold.

6. The computer-implemented method of claim 5, wherein determining the slowness indicator comprises:
    determining a quantity of slowness events over a time period for the first codec.

7. A system comprising:
    a data storage medium to store computer-executable instructions; and
    a computer hardware processor in communication with the data storage medium, wherein the computer hardware processor executes the computer-executable instructions to at least:
        generate first encoded video data with a first codec at a computing device;
        transmit the first encoded video data to a recipient device;
        monitor encoding performance of the first codec at the computing device, wherein to monitor the encoding performance, the computer hardware processor executes the computer-executable instructions to:
            determine that a quantity of frames encoded over a period of time using the first codec fails to satisfy a first threshold; and
        responsive to determining that the quantity of frames encoded over the period of time using the first codec fails to satisfy the first threshold:
            select a second codec associated with a lower expected usage of a computing resource than the first codec;
            generate second encoded video data with the second codec at the computing device; and
            transmit the second encoded video data to the recipient device.

8. The system of claim 7, wherein the computer hardware processor executes additional computer-executable instructions to at least:
    calculate a first encoding score for a first execution of the first codec at the computing device, wherein to calculate the first encoding score, the computer hardware processor executes the additional computer-executable instructions to:

calculate a first quality metric that indicates a first encoding quality of a first video portion during the first execution;

calculate a first computing resource usage metric that indicates a first quantity of processor cycles used to encode the first video portion during the first execution; and combine the first quality metric and the first computing resource usage metric as the first encoding score;

calculate a second encoding score for a second execution of a third codec at the computing device, wherein to calculate the second encoding score, the computer hardware processor executes the additional computer-executable instructions to:

calculate a second quality metric that indicates a second encoding quality of a second video portion during the second execution;

calculate a second computing resource usage metric that indicates a second quantity of processor cycles used to encode the second video portion during the second execution; and combine the second quality metric and the second computing resource usage metric as the second encoding score; and select the first codec instead of the third codec based at least in part on the first encoding score and the second encoding score.

9. The system of claim 8, wherein the computer hardware processor executes further computer-executable instructions to at least:

execute the first codec at the computing device for a first time period; and determine, from a metrics report for the first time period, (i) a total pixels encoded, (ii) a bit rate, and (iii) a total encoding time, wherein to calculate the first quality metric, the computer hardware processor executes the further computer-executable instructions to:

calculate the first quality metric from (i) the total pixels encoded and (ii) the bit rate; wherein to calculate the first computing resource usage metric, the computer hardware processor executes the further computer-executable instructions to:

calculate the first computing resource usage metric from (i) the total pixels encoded and (ii) the total encoding time.

10. The system of claim 7, wherein to monitor the encoding performance, the computer hardware processor executes further computer-executable instructions to at least:

determine a quantity of consecutive slowness events over a time period for the first codec; and determine that the quantity of consecutive slowness events fails to satisfy a second threshold.

11. The system of claim 10, wherein to determine the quantity of consecutive slowness events, the computer hardware processor executes additional computer-executable instructions to at least:

determine, in the time period, a first slowness event and a second slowness event following the first slowness event without an intervening non-slowness event.

12. The system of claim 7, wherein the first codec corresponds to a VP8 codec, a VP9 codec, an H264 codec, an H265 codec, or an AV1 codec.

13. The system of claim 7, wherein the computer hardware processor executes further computer-executable instructions to at least:

determine that the second codec is expected to use fewer of the computing resource at encoding than the first codec based at least in part on data from a metrics report.

14. One or more non-transitory computer-readable storage media storing computer-executable instructions that when executed by a computing system perform operations comprising:

calculating a first encoding score for a first execution of a first codec at a computing device, wherein calculating the first encoding score comprises:

calculating a first quality metric that indicates a first encoding quality of a first video portion during the first execution;

calculating a first computing resource usage metric that indicates a first quantity of processor cycles used to encode the first video portion during the first execution; and combining the first quality metric and the first computing resource usage metric as the first encoding score;

calculating a second encoding score for a second execution of a second codec at the computing device, wherein calculating the second encoding score comprises:

calculating a second quality metric that indicates a second encoding quality of a second video portion during the second execution;

calculating a second computing resource usage metric that indicates a second quantity of processor cycles used to encode the second video portion during the second execution; and combining the second quality metric and the second computing resource usage metric as the second encoding score;

selecting the first codec instead of the second codec based at least in part on the first encoding score and the second encoding score;

generating first encoded video data with the first codec at the computing device; and transmitting the first encoded video data to a recipient device.

15. The one or more non-transitory computer-readable storage media of claim 14 storing further computer-executable instructions that when executed by the computing system perform further operations comprising:

monitoring encoding performance of the first codec over a sliding window at the computing device, wherein monitoring the encoding performance further comprises:

determining that a quantity of frames encoded over a period of time fails to satisfy a first threshold;

selecting a third codec associated with a lower expected usage of a computing resource;

generate second encoded video data with the third codec at the computing device; and transmit the second encoded video data to the recipient device.

16. The one or more non-transitory computer-readable storage media of claim 15, wherein monitoring the encoding performance further comprises:

determining a quantity of slowness events over a time period for the first codec; and determining that the quantity of slowness events fails to satisfy a second threshold.

17. The one or more non-transitory computer-readable storage media of claim 15, wherein monitoring the encoding performance further comprises:

determining a quantity of consecutive slowness events over a time period for the first codec; and determining that the quantity of consecutive slowness events fails to satisfy a second threshold.

18. The one or more non-transitory computer-readable storage media of claim 14, wherein calculating the first quality metric further comprises:

calculating the first quality metric from (i) a total pixels encoded and (ii) a bit rate, wherein calculating the first computing resource usage metric further comprises:

calculating the first computing resource usage metric from (i) the total pixels encoded and (ii) a total encoding time.

19. The one or more non-transitory computer-readable storage media of claim 18 storing further computer-executable instructions that when executed by the computing system perform further operations comprising:

determining, from a metrics report, (i) the total pixels encoded, (ii) the bit rate, and (iii) the total encoding time.

20. The one or more non-transitory computer-readable storage media of claim 14, wherein calculating the first encoding score further comprises:

calculating a statistical measure from a plurality of encoding scores over an evaluation period for the first codec.

\* \* \* \* \*